(12) United States Patent
Van Den Goor et al.

(10) Patent No.: US 8,770,379 B2
(45) Date of Patent: Jul. 8, 2014

(54) SORTING DEVICE

(75) Inventors: Jacobus Marie Van Den Goor, Nuenen (NL); Erwin Hendrikus Petrus Martinus Johannes Van Schaijk, Vinkel (NL); Martinus Johannes Maria Vertogen, Zeeland (NL); Johannes Petrus Maria Vissers, Eindhoven (NL)

(73) Assignee: Vanderlande Industries B.V., Veghel (NL)

( * ) Notice: Subject to any disclaimer, the term of this patent is extended or adjusted under 35 U.S.C. 154(b) by 727 days.

(21) Appl. No.: 12/937,636

(22) PCT Filed: Apr. 10, 2009

(86) PCT No.: PCT/NL2009/000092
§ 371 (c)(1),
(2), (4) Date: Jan. 12, 2011

(87) PCT Pub. No.: WO2009/128706
PCT Pub. Date: Oct. 22, 2009

(65) Prior Publication Data
US 2011/0108388 A1 May 12, 2011

(30) Foreign Application Priority Data

Apr. 14, 2008 (NL) .................................... 1035292

(51) Int. Cl.
| | |
|---|---|
| B65G 47/46 | (2006.01) |
| B65G 47/84 | (2006.01) |
| B65G 17/00 | (2006.01) |
| B65G 21/16 | (2006.01) |
| B65G 17/06 | (2006.01) |

(52) U.S. Cl.
CPC ............. *B65G 47/844* (2013.01); *B65G 17/005* (2013.01); *B65G 2207/36* (2013.01); *B65G 21/16* (2013.01); *B65G 17/066* (2013.01)
USPC ....................... 198/370.02; 198/852

(58) Field of Classification Search
USPC ............ 198/370.01, 370.02, 370.03, 370.07, 198/831, 852, 853, 890, 890.1
See application file for complete search history.

(56) References Cited

U.S. PATENT DOCUMENTS 3,643,792 A * 2/1972 Resener ......................... 198/834
4,732,260 A * 3/1988 Canziani ................... 198/370.02
(Continued)

FOREIGN PATENT DOCUMENTS

EP 0 782 966 7/1997
WO WO 2005019069 A1 * 3/2005 ............. B65G 17/34

OTHER PUBLICATIONS

International Search Report issued Jun. 15, 2009 in PCT/NL09/000092 filed Apr. 10, 2009.

*Primary Examiner* — William R Harp
(74) *Attorney, Agent, or Firm* — Oblon, Spivak, McClelland, Maier & Neustadt, L.L.P.

(57) ABSTRACT

A sorting device including successive load carrying platforms having a front edge and a rear edge for supporting products to be sorted on a supporting surface, a conveying mechanism conveying the load carrying platforms in a conveying direction along a conveying path, a sorting mechanism including plural pusher elements pushing a product to be sorted sideways off at least one supporting surface at a desired sorting location. The pusher elements each extend above at least one load carrying platform and are arranged for being jointly conveyed with the at least one load carrying platform in the conveying direction. A drive mechanism moves the at least one pusher element sideways at the desired sorting location. An arcuate shape of a front edge of a load carrying platform, as seen in top plan view, abuts an arcuate shape of a rear edge of a next load carrying platform.

31 Claims, 7 Drawing Sheets

(56) References Cited

U.S. PATENT DOCUMENTS

| | | | |
|---|---|---|---|
| 5,394,978 A * | 3/1995 | Majewski et al. | 198/833 |
| 5,435,429 A * | 7/1995 | Van Den Goor | 198/890.1 |
| 5,657,858 A * | 8/1997 | Van Den Goor | 198/890 |
| 5,909,797 A | 6/1999 | Van Den Goor | |
| 6,041,909 A * | 3/2000 | Shearer, Jr. | 198/370.02 |
| 6,360,868 B1 * | 3/2002 | Arlt et al. | 198/370.06 |
| 6,698,571 B2 * | 3/2004 | Bonnet | 198/370.02 |
| 7,337,892 B2 | 3/2008 | Groot et al. | |
| 7,431,164 B2 | 10/2008 | Groot et al. | |
| 7,588,140 B2 | 9/2009 | Van Den Goor et al. | |
| 8,297,430 B2 * | 10/2012 | Van Den Goor et al. | 198/370.02 |
| 8,424,670 B2 * | 4/2013 | Van Den Goor | 198/370.02 |
| 2005/0077144 A1 | 4/2005 | Berkers et al. | |

* cited by examiner

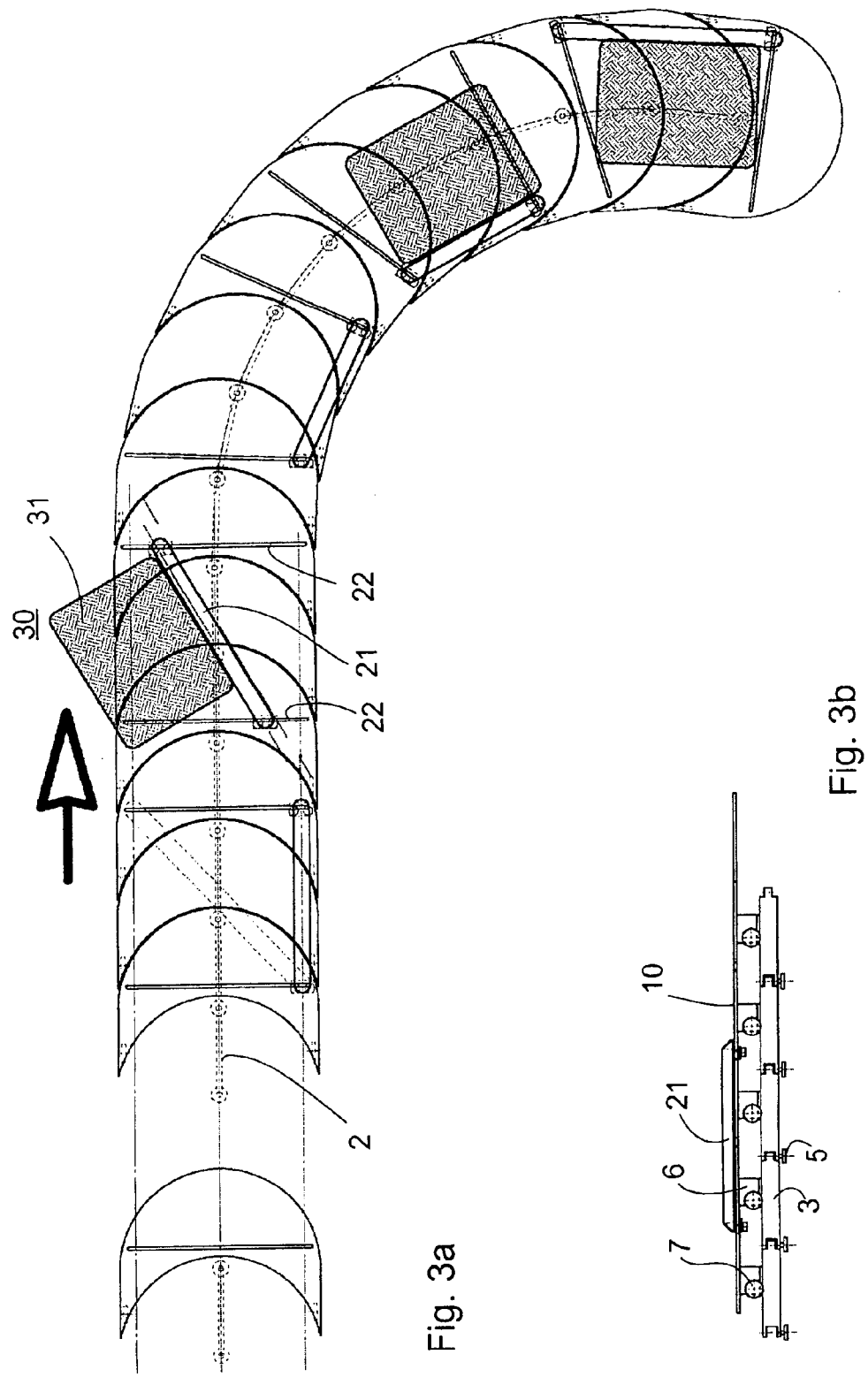
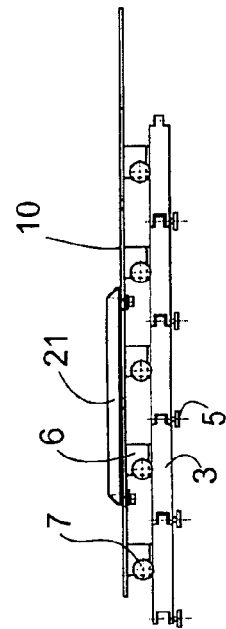

SORTING DEVICE

The present invention relates to a sorting device for sorting products, comprising successive load carrying platforms having a front edge and a rear edge for supporting products to be sorted on a supporting surface thereof, conveying means for conveying the load carrying platforms in a conveying direction along a conveying path, sorting means comprising a plurality of pusher elements for pushing a product to be sorted sideways off at least one supporting surface at a desired sorting location using at least one pusher element which pusher elements each extend above at least part of said at least one load carrying platform and which are arranged for being jointly conveyed with said at least one load carrying platform in the conveying direction, and drive means for moving said at least one pusher element sideways at a desired sorting location.

BACKGROUND OF THE INVENTION

In 2007, a sorting system called BAXORTER, in particular for automated luggage handling, was put on the market by Vanderlande Industries Nederland B.V. Said known sorting system makes use of an endless train of rectangular load carrying platforms having a length of about 1.2 m, directly above which sorting beams are provided, which can be mechanically controlled at a sorting location to move from one longitudinal side to the other longitudinal side of the load carrying platform and push a product present on said load carrying platform, for example a piece of luggage, off the load carrying platform upon making said movement. Closing plates are provided between the load carrying platforms at both ends of each load carrying platform, the object of said closing plates being to fill the space between load carrying platforms so as to prevent objects getting between the load carrying platforms, which could lead to damage and malfunctions. The closing plates of adjacent load carrying platforms overlap and are provided with a curved outer edge oriented towards the respective adjacent load carrying platform, the curved outer edges of which overlapping closing plates cross one another. The aforesaid arcuate shape is necessary in order to be able to pass through bends. Because of the aforesaid arcuate shape, a triangular surface is present between the overlapping closing plates on the two opposite outer sides thereof, which surface is not screened by the closing plates themselves and which may need to be screened separately by further closing elements that are movable with respect to one or both closing plates. All in all, several measures need to be taken to realise a so-called closed deck as much as possible so as to reduce the risk of objects, for example straps of pieces of luggage, getting under or between the load carrying platforms. The object of the present invention is in any case to provide a constructionally relatively simple solution for realising a closed deck in sorting devices of the kind referred to in the introduction.

Since many years, Vanderlande Industries Nederland B.V. have furthermore marketed a sorting system under the name of POSISORTER. Said sorting system makes use of transversely oriented carriers arranged relatively close behind each other, along which pusher shoes are movable in the longitudinal direction of the carriers, so that products, such as packages, present on a number of successive carriers can thus be pushed off said carriers by the pusher shoes at a sorting location. The carriers follow an endless path in a vertical circuit. Only the upper half of said circuit can be utilised for sorting products. In said upper half, as in the lower half for that matter, the carriers follow a rectilinear conveying path. To increase the sorting capacity, EP-A1-782 966 discloses a comparable sorting system comprising carriers and pusher shoes movable along the carriers, with the endless circuit extending in the horizontal plane. So far it has not been possible, however, to be commercially successful on the market with such a system. The object of the invention is furthermore to provide an alternative to sorting systems such as the POSISORTER which has commercial possibilities, which alternative distinguishes itself in that the entire length of the conveying path can be utilised and wherein, in addition, the aforesaid closed deck principle is maintained not only in rectilinear parts of the conveying path but also in curved parts.

SUMMARY OF THE INVENTION

In order to accomplish the above objects, both the front edge of each load carrying platform and the rear edge of each load carrying platform are arcuate in shape, seen in top plan view, with the arcuate shape of the front edge of a load carrying platform abutting the arcuate shape of the rear edge of a next load carrying platform located at the front of the respective load carrying platform. Because of the aforesaid arcuate shape of the abutting edges of adjacent load carrying platforms, each load carrying platform can pivot with respect to an adjacent load carrying platform about a pivot axis that coincides with the centre of the arcuate shape in question without the closed nature of the transition between the respective load carrying platforms being lost. Add to this the fact that precisely because of the arcuate shape, the gap between the load carrying platforms, which is practically inevitable and which is logically arcuate in shape as well, reduces the risk of objects getting between the load carrying platforms in comparison with a rectilinear gap that would have the same width.

To simplify the drive of the pusher elements, the drive means preferably comprise at least one driver for each pusher element, which driver is connected to an associated pusher element via connecting means. Each pusher element can thus be driven via said at least one driver.

The aforesaid connecting means preferably extend through at least one through slot in the at least one associated load carrying platform. The pusher elements and the associated drivers can thus be arranged comparatively close together, thus making it possible to use connecting means of very simple design as well. The use of a through slot in a load carrying platform in principle involves the risk of objects getting jammed in the slot. Tests have shown, however, that in practice this risk is limited and, in addition, can be further reduced by taking additional measures, for example providing brushes which extend within the slot, along which the connecting means can move.

In particular if the sorting device according to the invention is designed for using only one pusher element for each product to be sorted, the pusher element in question needs to have dimensions approximately equal to the dimensions of the product to be sorted, seen in the conveying direction. As the dimensions in question increase, it will be advantageous if the sorting means comprise two drivers for each pusher element, which drivers are each connected at different positions to the associated pusher element via the connecting means, so that a single pusher element can push a product off an associated load carrying platform in a stable manner at a sorting location.

It is furthermore preferable in that connection if a slot is provided in said at least one associated load carrying platform for each of the two drivers, through which slot the associated connecting means extend.

The two slots in question are furthermore preferably provided in two different load carrying platforms. The dimensions of the load carrying platforms can thus remain limited, at least in the conveying direction, whilst nevertheless comparatively long pusher elements can be used, by means of which comparatively large products, such as packages or pieces of luggage, can be individually sorted. The advantage of using load carrying platforms having limited dimensions is that it is possible to pass through comparatively sharp bends.

The above positive effects can be further enhanced if at least one intermediate load carrying platform is provided between the two different load carrying platforms provided with the respective slots, which at least one intermediate load carrying platform is furthermore preferably free from slots, so that the intermediate load carrying platform is easier and thus cheaper to produce. In addition, the risk of objects getting jammed in the sorting device is thus further reduced.

To compensate for the change in the spacing between the two slots associated with a single pusher element when passing through bends, it is preferable if the pusher element comprises at least two pusher element parts which are telescopically movable relative to each other for the purpose of changing the length of the pusher element, and/or if the pusher element is connected to at least one of the associated pusher elements by the connecting means in such a manner as to be movable in a longitudinal direction of the pusher element.

Said at least one slot is preferably oriented perpendicular to the conveying direction, so that the slot takes up as little length of the associated load carrying platform as possible and the pusher element will furthermore not move in the conveying direction with respect to the load carrying platform during movement of the moving means.

A very suitable way of driving the pusher elements is obtained if the drive means comprise a stationary guide oriented at an angle relative to the conveying direction at the sorting location, with which stationary guide said at least one driver can be selectively caused to interact.

Alternatively it may also be very advantageous if the drive means comprise at least one driving motor for each pusher element, which driving motor is connected to a load carrying platform associated with the pusher element for joint transport in the conveying direction with the respective load carrying platform, thus providing a much greater degree of freedom with regard to the exact position where the drive means are operative, and rear the actual sorting process takes place, therefore.

According to a very important preferred embodiment, adjacent load carrying platforms are arranged in line with each other. Thus, one large joint supporting surface is created along the full length of the conveying path along which the sorting device moves.

In order to further reduce the risk of objects getting jammed in gaps formed between abutting front and rear edges of the adjacent load carrying platforms, it is preferable if adjacent load carrying platforms overlap at the location of the associated abutting front and rear edges, in which case adjacent load carrying platforms are arranged in line with each other, as described with reference to the preceding preferred embodiment.

From a practical point of view, said overlap can be realised in an advantageous manner if the abutting front and rear edges have a complementary stepped configuration, seen in vertical section parallel to the conveying direction and/or if the abutting front and rear edges have a parallel inclined configuration, seen in vertical section parallel to the conveying direction. An overlap realised in this way makes it possible in a relatively simple manner, in spite of the overlap, to remove a single load carrying platform from the train of load carrying platforms and replace it by another load carrying platform.

An alternative solution to the problem of the risk of objects getting between adjacent load carrying platforms is realised if successive load carrying platforms are provided with aligned grooves at their facing sides, in which a (preferably strip-shaped) closing element is provided. Such a closing element not only provides a closure, but it can also provide a correct vertical alignment of the adjacent load carrying platforms relative to each other.

A very suitable way of driving the sorting device as a whole is realised if the conveying means comprise an elongated flexible conveying element under the load carrying platforms, which conveying element is provided with links which can pivot about vertical pivot axes relative to each other, whilst each load carrying platform is connected to a link.

BRIEF DESCRIPTION OF THE DRAWINGS

The invention will now be explained in more detail by means of a description of two preferred embodiments of a sorting device according to the invention, in which reference is made to the following figures:

FIG. 3a is a top plan view of part of the sorting device of FIG. 1 during operation;

FIG. 3b is a side view of part of the sorting device of FIG. 3a;

DETAILED DESCRIPTION OF THE PREFERRED EMBODIMENTS

Figure 1:
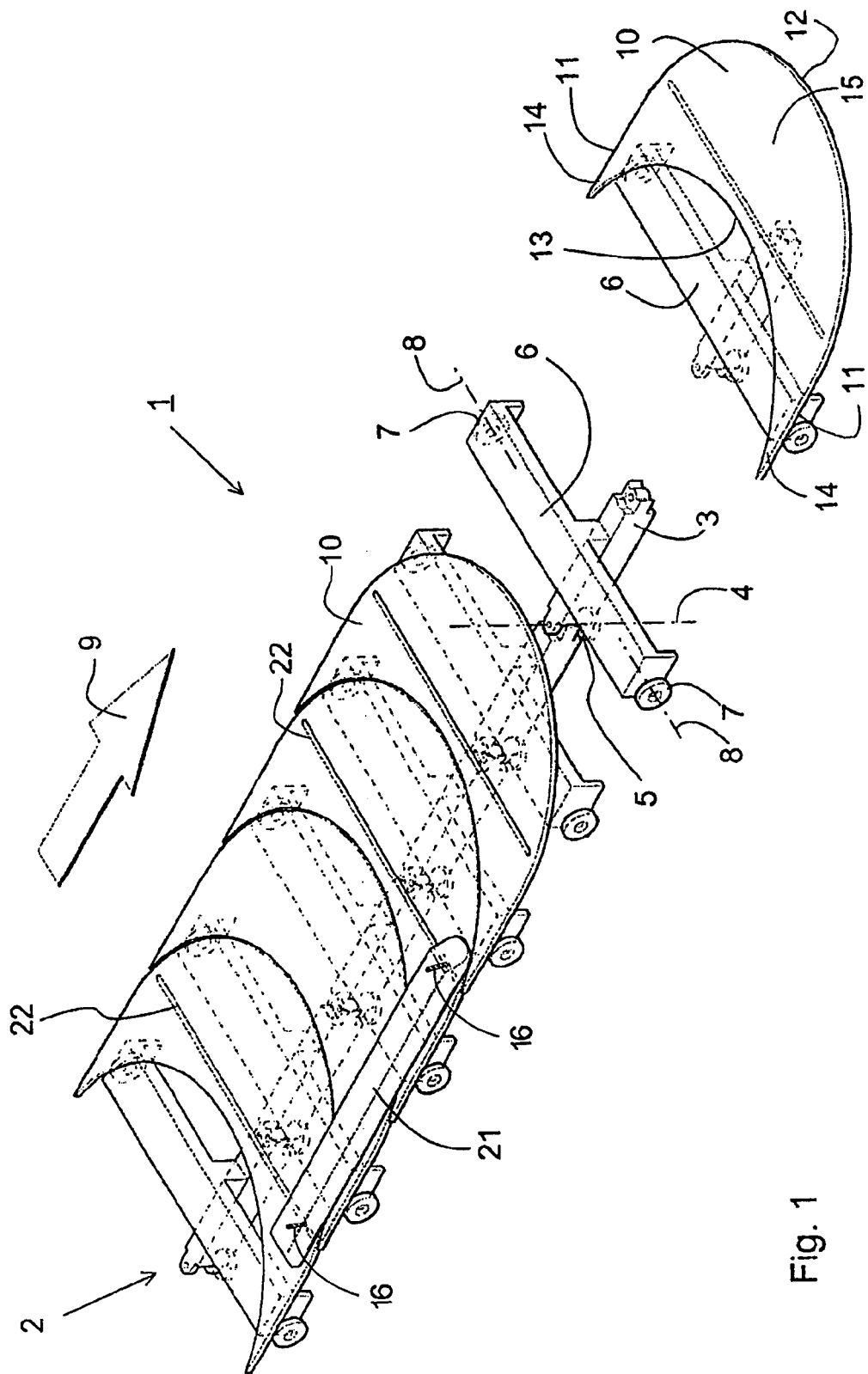
FIG. 1 is a perspective view of part of a sorting device according to a first preferred embodiment of the invention.

FIG. 1 shows part of a sorting device 1 according to a first preferred embodiment of the invention. The sorting device 1 comprises a chain 2. The chain 2 comprises links 3, which are pivotally connected about vertical pivot axles 4. A guide wheel 5 is provided for each link 3, the central axis of which guide wheel coincides with that of an associated pivot axles 4. The guide wheels 5 run in a U-shaped guide (not shown), which extends in an endless conveying path. Provided at the upper side of each link 3 is furthermore a transversely oriented supporting arm 6, with running wheels 7 mounted to two opposite ends thereof, the central axes of which running wheels are oriented transversely to the conveying direction 9 of the sorting device 1 and in line with each other. The running wheels 7 run on rails (not shown), which extend parallel to the conveying path defined by the U-shaped guides the guide wheels 5.

Furthermore, a load carrying platform 10 is provided for each link. The successive load carrying platforms are in line with each other. Each load carrying platform 10 is more or less moon-shaped. The circumference thereof is defined by two at least substantially straight side edges 11, an arcuate front edge 12 and a likewise arcuate rear edge 13. The edges 12, 13 have an angle of arc of about 95 degrees. Generally, said angle of arc preferably ranges between 70 and 120 degrees. At the tips 14 of the moon shape, each load carrying platform 10 is rigidly connected to a supporting arm 6 disposed thereunder, whilst each load carrying platform 10 is supported at the location of the main surface 15 by a supporting arm 6 associated with a next link 3, which is located in front thereof, without being connected to said supporting arm 6, so that relative movement between the load carrying platform 10 and the respective next supporting arm 6 is possible.

The radii of curvature of the front edge 12 and the rear page 13 correspond, so that the arcuate shape of the front edge of a load carrying platform matches the arcuate shape of the rear edge of a next load carrying platform 10 located at the front of the load carrying platform 10 in question. The successive load carrying platforms 10 thus form an at least substantially closed surface, or, in other words, a closed deck. This closed nature is maintained when passing through bends in the conveying path, as is shown on the right-hand side in FIG. 3*a*. Upon passing through a bend, each load carrying platform 10 moves over the supporting arm 6 disposed thereunder at the location of its main surface 15. The load carrying platforms 10 and the links 3 are so dimensioned and positioned relative to each other that the central axes of the radii of curvature of abutting front edges 12 and rear edges 13 coincide with a pivot axle 4, as is shown in particular in FIG. 3*a*.

In order to make it possible to push a product to be sorted, which is supported by one or a number of load carrying platforms 10, off the load carrying platforms, the sorting device 1 further comprises a pusher beam 21 for every three load carrying platforms 10. The load carrying platforms 10 provided at opposite ends of the pusher beam 21 are provided with a through slot 22, unlike the load carrying platforms 10 located therebetween, which slot is oriented transversely to the conveying direction 9. The slot 22 extends over substantially the entire width (this is the dimension of each load carrying platform 10, seen in a direction perpendicular to the conveying direction 9) of the associated load carrying platform 10. In an alternative embodiment, each load carrying platform might consist of two parts defining a through slot, such as the slot 22, between them, which two parts are interconnected at the ends of the slot.

Figure 2:
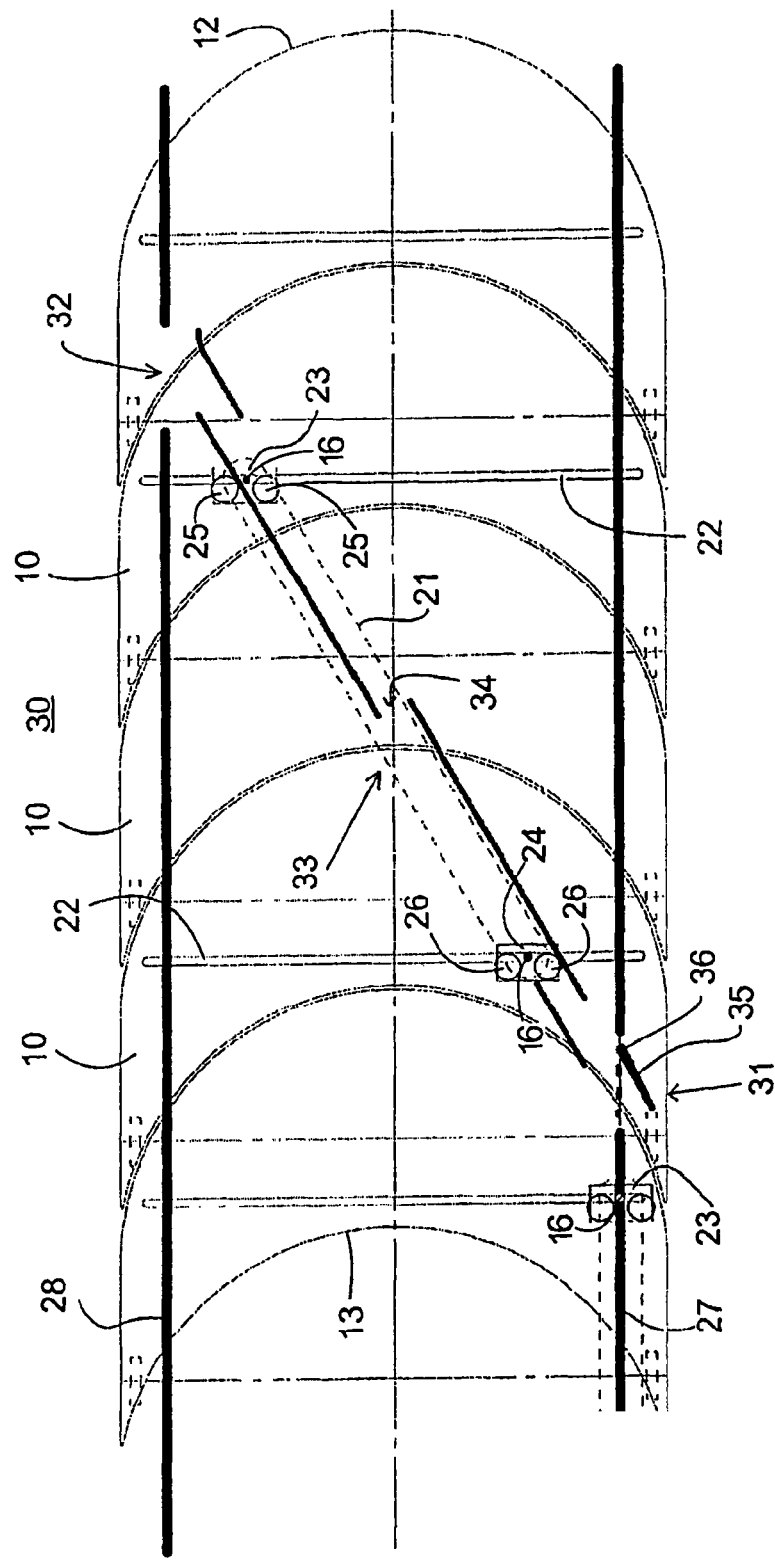
FIG. 2 is a top plan view, with transparent load carrying platforms, of part of the sorting device of FIG. 1.

Via the slots 22 and vertical pivot axles 16, each pusher beam 21 is pivotally connected, about the vertical pivot axles 16, to a guide member disposed under the associated load carrying platform 10, more specifically to a front guide member 23 and a rear guide member 24 (see FIG. 2). Said guide members 23, 24 are arranged for cooperation with a guide system which is provided under the load carrying platforms 10. For a more detailed description of said guide members 23, 24 and the guide system, reference is made to Dutch patent application NL 1034156, the entire contents and disclosure of which are incorporated by reference herein.

Each guide member 23, 24 comprises two guide wheels 25, 26, which are arranged side by side in pairs, a limited distance apart. The guide system under the load carrying platforms 10 comprises parallel rails 27, 28 near the longitudinal sides of the load carrying platforms 10, which rails 27, 28 extend parallel to the conveying direction.

During normal use, when no sorting action is taking place, one of the rails 27, 28 extends between the wheels 25, 26 of the guide member 23, 24, so that the guide member 23, 24, and thus the associated pusher beam 21, will move along the respective rails 27, 28. The rails 27, 28 are interrupted at a sorting location 30, at the location indicated by reference numerals 31, 32, so as to enable the guide members 23, 24 to become detached from the respective rails 27, 28 during a sorting action. In the example shown in FIG. 2, the sorting location is arranged for pushing a product present on the load carrying platforms 10 beside a pusher beam 21, which (initially) extends above the rail 27, in the direction of the rail 28. A sorting guide system 33 extends between the interruptions 31, 32, which system is likewise described in the aforesaid Dutch patent application NL 1034156.

It is furthermore noted that the sorting guide system 33 is interrupted halfway its length, at the location indicated at 34, so as to enable the chain 2 to pass the sorting guide system 33. It is furthermore worth mentioning that a switch 35 is provided in the rail 27 at the location of the interruption 31, which switch can pivot forward and backward between two positions about a vertical pivot axle 36. In the position shown in FIG. 2, the switch 35 will force the guide members 23, 24 in the direction of the sorting guide system 33, causing the associated pusher beam 21 to cross from the side of the rail 27 to the side of the rail 28 and push a product adjacent thereto on the load carrying platforms 10 off said platforms during said transverse movement. At the location of the interruption 32, the guide members 23, 24 will resume their cooperation with the rail 28 again. In the position of the switch 35 that is illustrated in dotted lines, the pusher beam 21 will continue to follow the rail 27 past the switch 35 as well.

As shown in FIG. 3*a*, the pusher beam 21 is telescopic, so that its length can change. This is necessary not only during the above-described sorting action when the spacing between two through slots 22 associated with a pusher beam 21 remains unchanged, but the length of the pusher beam 21 needs to change, because of the oblique orientation thereof between the slots 22, if the guide members 23, 24 are spaced by a fixed distance from the ends of the pusher beam 21. Alternatively, it would also be possible to use a pusher beam 21 having a fixed length, in which case the pusher beam 21 could be slidably connected to one or both of the guide members 23, 24. The telescopic nature of the pusher beam 21 is also advantageous when passing through bends, as the spacing between the adjacent slots associated with a pusher beam 21 will change during said movement. For example, in the inside bend, said spacing will decrease, whereas said spacing will increase in the outside bend. This is shown in FIG. 3*a*.

Figure 4:
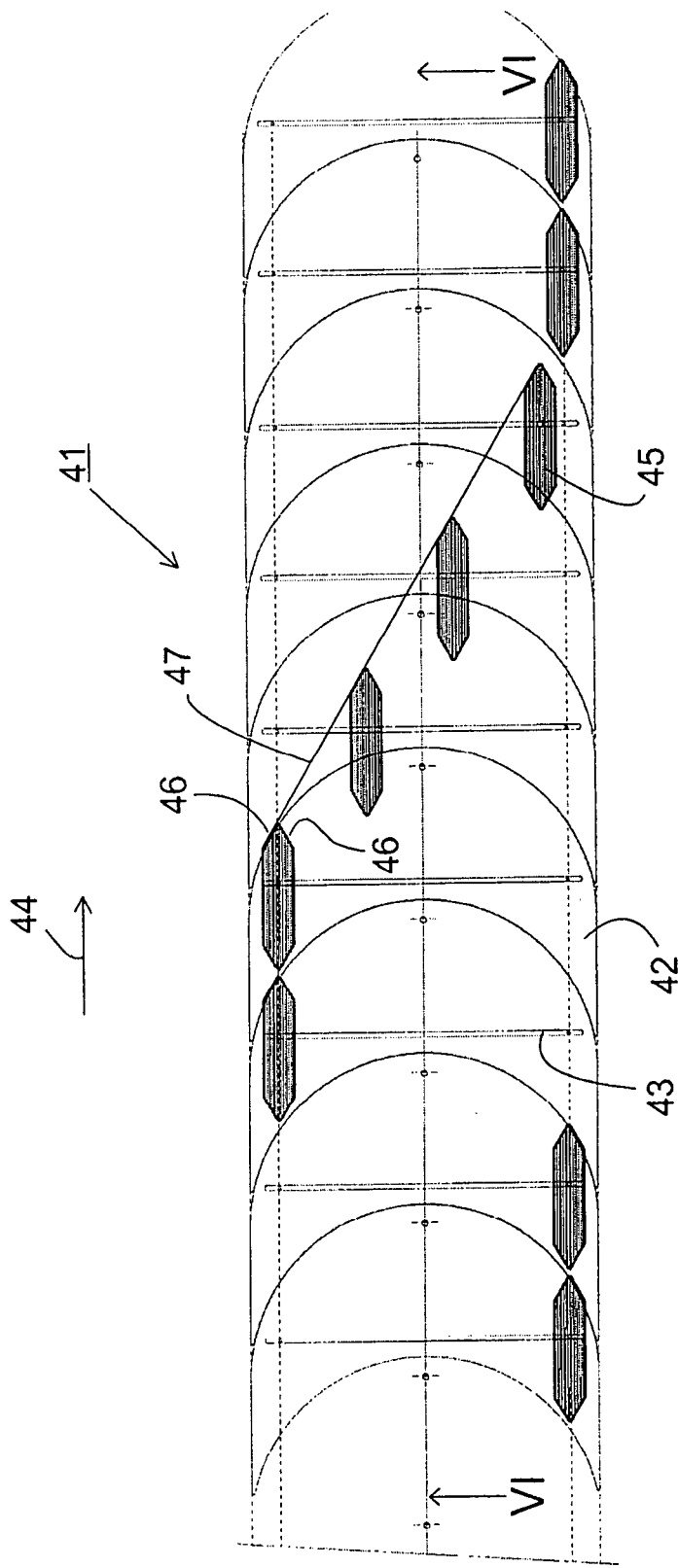
FIG. 4 is a top plan view of a second preferred embodiment of the sorting device according to the invention.

FIG. 4 shows a second preferred embodiment of a sorting device 41 according to the invention, which is very similar to the device 1 as described in the foregoing. The sorting device 41 comprises load carrying platforms 42, which correspond to the load carrying platforms 10 of the sorting device 1, at least insofar as slots 22 are present in said load carrying platforms 10. Each of the load carrying platforms 42 of the sorting device 41 has a slot 43 that is quite similar to the slots 22. The sorting device 41 uses a chain, such as the chain 2, with supporting arms, such as the supporting arms 6, for driving the load carrying platforms 42 in the conveying direction 44. Furthermore, a guide system is provided under the load carrying platforms 42, which guide system is quite similar to the guide system used in the sorting device 1, i.e. comprising rails, such as the rails 27, 28, and a sorting guide system, such as the sorting guide system 33.

The main difference between the sorting device 41 and the sorting device 1 is the length of the pusher beams 45, which is significantly less than the length of the pusher beam 21. The fact is that the length of the pusher beams 45 is nearly the same as the pitch distance of the links 3 disposed thereunder or, in other words, of the associated load carrying platforms 42.

Only one guide member is provided for each pusher beam 45 under the associated load carrying platform 42, which guide member is similar to one of the guide members 23, 24 of the sorting device 1. The guide member in question (not shown) is rigidly connected to the associated pusher beam 45. Although it is possible in the sorting device 1 to push products off the common supporting surface defined by the load carrying platforms 42 by means of a single pusher beam 45, the sorting device 41 is in particular suitable for pushing a product to be sorted off the load carrying platforms by means of a number of pusher beams 45 in a manner similar to the manner in which a number of pusher shoes simultaneously push products off the supporting surface in the aforesaid prior art POSISORTER.

Figure 5:
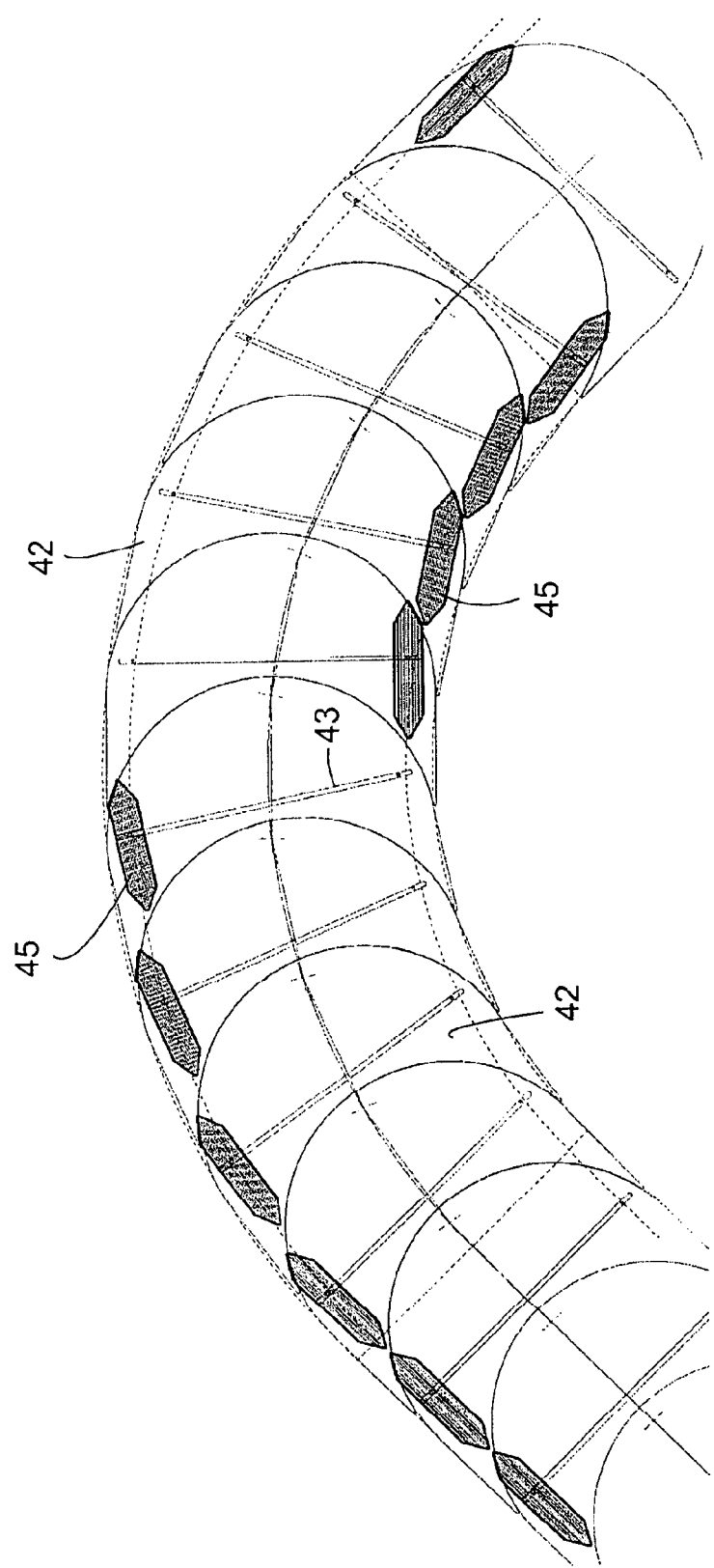
FIG. 5 is a top plan view of the sorting device of FIG. 4 passing through a bend.

In this embodiment, the ends of the pusher beams 45 are pointed, with inclined flanks 46, which define a joint pushing surface 47 (indicated by a dashed line), at least during movement of the pusher beams 45 transversely to the conveying direction 44. In addition to that, the pointed shape has the advantage that the points of adjacent pusher beams 45 will be positioned beside each other in an inside bend, as shown in FIG. 5, thus giving each other sufficient space, in spite of the length of the pusher beams.

Figure 6A:
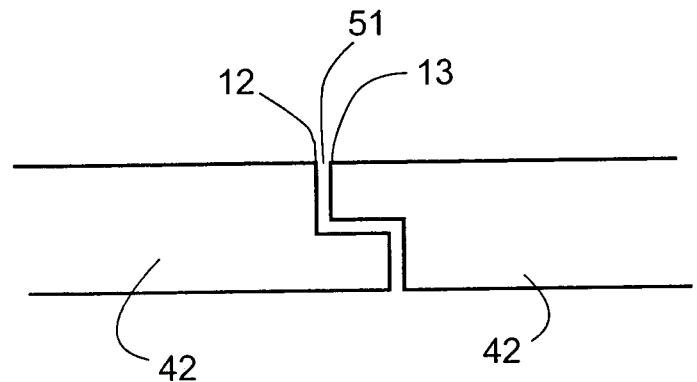
FIG. 6a is a vertical sectional view along the line VI-VI in FIG. 4 at the transition between two successive load carrying platforms.
Figure 6B:
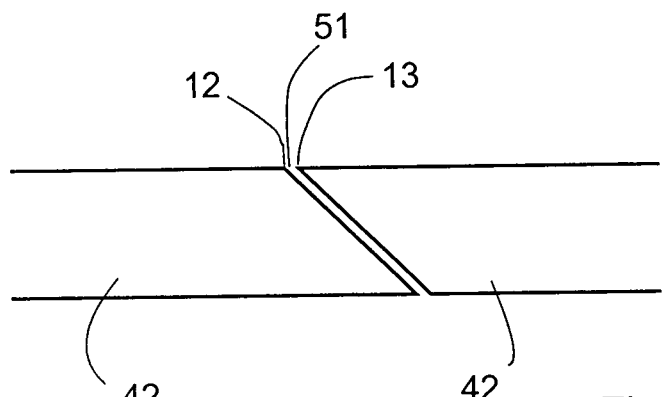
FIG. 6b is a sectional view corresponding to FIG. 6a of an alternative embodiment.

FIGS. 6a and 6b show the gap 51 that is present between two successive load carrying platforms 42 at the location of the front edge 12 and the rear edge 13 thereof. In principle said gap 51 involves a risk that objects, such as a buckle, for example, will get jammed therebetween, which may interfere with such a product being pushed off the load carrying platforms 42. Said risk is limited precisely because of the arcuate shape of the gap 51, to be true, but said risk can be further reduced by having the successive load carrying platforms 42 (or the load carrying platforms 10 in the sorting device 1) overlap at the location of the respective edges, which to that end have a complementary stepped configuration or which alternatively, as shown in FIG. 6b, have a parallel inclined configuration.

Figure 6C:
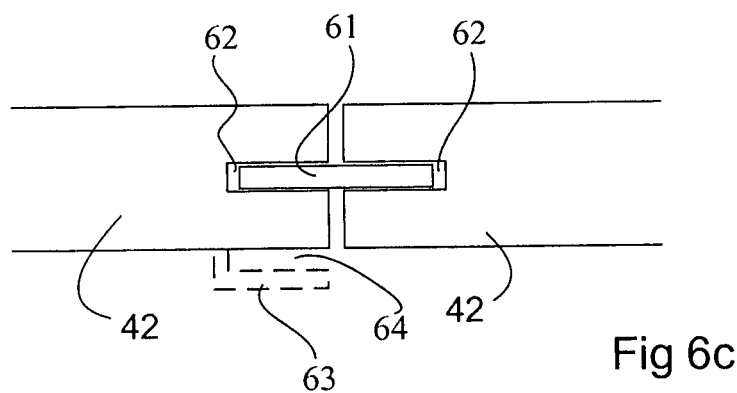
FIG. 6c is a sectional view corresponding to FIG. 6a of another alternative embodiment.

According to another alternative embodiment, a closing or aligning element, such as the arcuate strip 61, for example made of plastic or stainless steel, is used between two successive load carrying platforms 42, which strip in any case extends with a limited amount of vertical clearance within aligned, facing grooves 62 in the facing short sides of the respective load carrying platforms 42, which are for example made of wood. The function of the strip 61 is twofold, viz. preventing objects getting between the load carrying platforms 42 and aligning the two load carrying platforms relative to each other. In the present example, the grooves 62 are formed in the short sides, but alternatively they could also be created under the load carrying platforms by making use of curved angle sections, such as the angle section 63, which is connected to the underside of a load carrying platform 42, as is shown by way of illustration in dotted lines only for the left-hand load carrying platform 42 in FIG. 6c, as a result of which the groove 64 could be formed. The strip 61 can be pushed into the grooves 64 from the side of the load carrying platforms 42. Advantageously, the strips 61 are retained in the grooves 64 at their ends. Those skilled in the art will appreciate that the strips 61 do not impede the pivoting movement relative to each other.

The scope of the invention is not limited to the preferred embodiments described in the foregoing, but it is in the first place determined by the appended claims.

Figure 7:
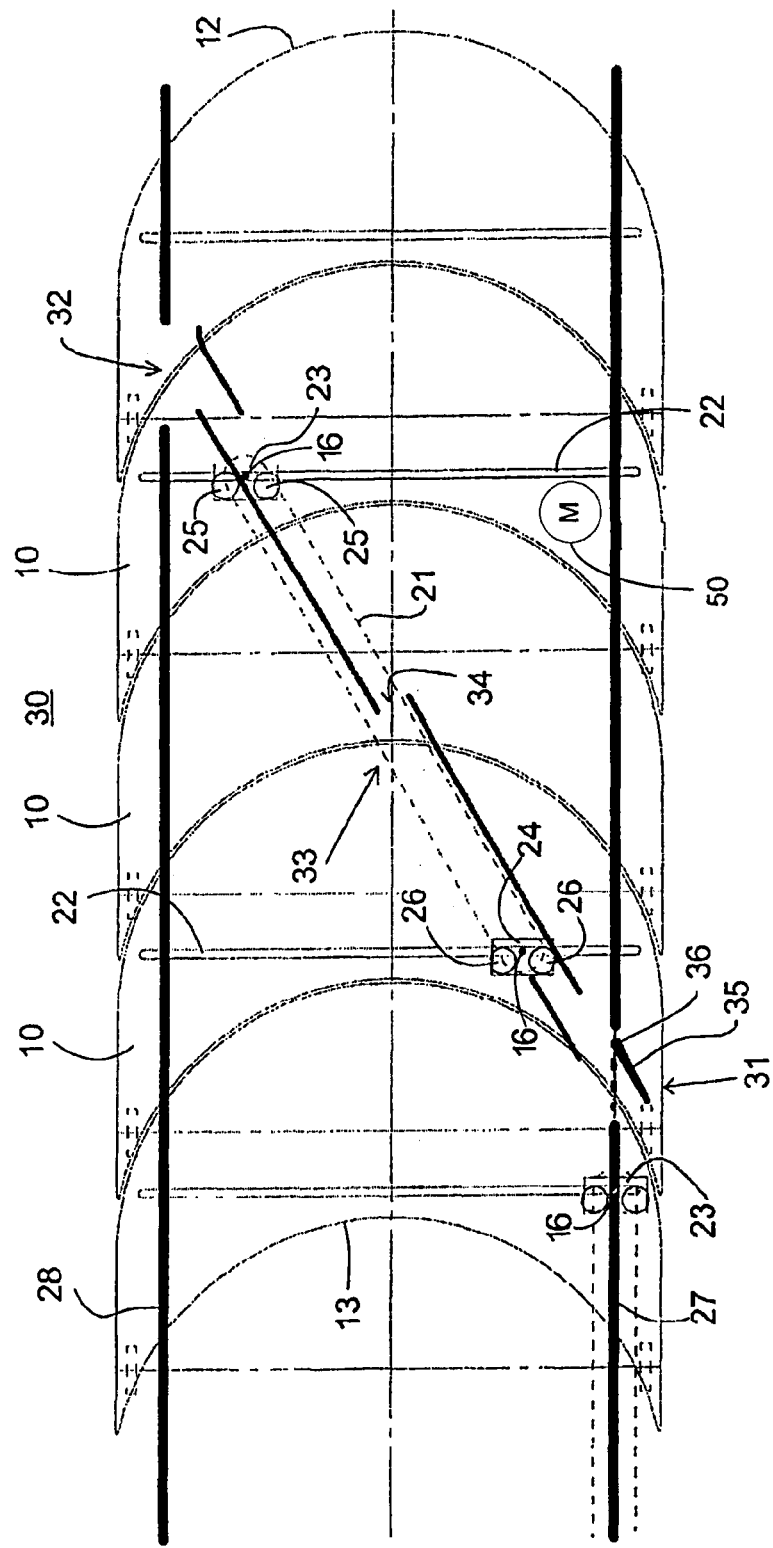
FIG. 7 is a top plan view corresponding to FIG. 2 of an alternative embodiment.

As an alternative to the use of a guide system disposed under the load carrying platforms, it is also possible, for example, to use one or two driving motors 70 for each pusher beam, as shown in FIG. 7. The driving motors 70 being connected to one or two load carrying platforms. For further explanation, reference is made to Dutch patent application NL 1034940, the entire contents and disclosure of which are incorporated by reference herein. When using elongated pusher beams, such as the pusher beam 21, with a guide member, such as the guide members 23, 24, at both ends, it may furthermore be decided by way of alternative to use two parallel, stationary guides for each sorting location, in which guides the respective guide members can move simultaneously and the pusher beam crosses from one longitudinal side to the other longitudinal side with its longitudinal direction parallel to the conveying direction, as is for example described in Dutch patent application NL 1033313, the entire contents and disclosure of which are incorporated by reference herein. Furthermore it might be decided to provide the two through slots, such as the slots 22, associated with elongated pusher beams, such as the pusher beam 21, in one and the same load carrying platform. In the latter case it is as a rule desirable to make the load carrying platforms longer.

The invention claimed is:

1. A sorting device for sorting products, comprising:
    load carrying platforms that are successive, each load carrying platform including a front edge, a rear edge, and a supporting surface for supporting products to be sorted;
    a conveying means for conveying the load carrying platforms in a conveying direction along a conveying path;
    a sorting means comprising a plurality of pusher elements for pushing the products to be sorted sideways off respective supporting surfaces at a desired sorting location, at least one pusher element of the plurality of pusher elements is separately connected to at least two of the load carrying platforms and is arranged to be jointly conveyed with the at least two of the load carrying platforms in the conveying direction; and
    a drive means for moving the at least one pusher element sideways at the desired sorting location;
    wherein the front edge of each load carrying platform and the rear edge of each load carrying platform has an arcuate shape, seen in a top plan view, and
    wherein an arcuate shape of a front edge of each load carrying platform located behind a next load carrying platform along the conveying path abuts an arcuate shape of a rear edge of the next load carrying platform.

2. A sorting device according to claim 1, wherein said drive means comprises at least one driver guide member for each pusher element, and
    wherein each guide member is connected to a pusher element by a connecting means.

3. A sorting device according to claim 2, wherein each connecting means extends through at least one through slot in a respective load carrying platform.

4. A sorting device according to claim 3, wherein said at least one through slot is oriented perpendicular to the conveying direction.

5. A sorting device according to claim 2, wherein the drive means comprises a stationary guide oriented at an angle relative to the conveying direction at the sorting location, and
    wherein at least one guide member is selectively caused to interact with the stationary guide.

6. A sorting device according to claim 2, wherein the drive means comprises at least one driving motor for each pusher element, and wherein each driving motor is connected to a load carrying platform associated with a respective pusher element for joint transport in the conveying direction with the load carrying platform associated with the respective pusher element.

7. A sorting device according to claim 1, wherein the drive means comprises two guide members for each pusher element, and
wherein each of the two guide members is connected at a respective position to a respective pusher element by a respective connecting means.

8. A sorting device according to claim 7, wherein a slot is provided in the at least two of the load carrying platforms for each of the two guide members connected to the at least one pusher element, and
wherein a respective connecting means extends through each slot.

9. A sorting device according to claim 8, wherein at least one intermediate load carrying platform is provided between the at least two of the load carrying platforms.

10. A sorting device according to claim 9, wherein said at least one intermediate load carrying platform is free from slots.

11. A sorting device according to claim 7, wherein for each pusher element, the two guide members are connected to the pusher element by respective connecting means at opposite ends of the pusher element.

12. A sorting device according to claim 7, wherein the at least one pusher element is telescopically movable for changing a length of the at least one pusher element.

13. A sorting device according to claim 7, wherein the at least one pusher element is connected to at least one respective guide member by respective connecting means in such a manner as to be movable in a longitudinal direction of the at least one pusher element.

14. A sorting device according to claim 1, wherein adjacent load carrying platforms are arranged in line with each other.

15. A sorting device according to claim 14, wherein adjacent load carrying platforms overlap at locations of respective abutting front and rear edges.

16. A sorting device according to claim 15, wherein the respective abutting front and rear edges have a complementary stepped configuration, seen in a vertical section parallel to the conveying direction.

17. A sorting device according to claim 15, wherein the respective abutting front and rear edges have a parallel inclined configuration, seen in a vertical section parallel to the conveying direction.

18. A sorting device according to claim 1, wherein a side of each load carrying platform located behind the next load carrying platform includes a groove and faces a side of the next loading carrying platform that includes a groove,
wherein the grooves are aligned, and
a closing element or a stripe shaped closing element is provided in the grooves.

19. A sorting device according to claim 1, wherein the conveying means comprises an elongated flexible conveying element under the load carrying platforms,
wherein the conveying element includes links that can pivot about vertical pivot axles relative to each other, and
wherein each load carrying platform is connected to a link.

20. A sorting device for sorting products, comprising:
load carrying platforms that are successive, each load carrying platform including a front edge, a rear edge, and a supporting surface for supporting products to be sorted;
a conveying means for conveying the load carrying platforms in a conveying direction along a conveying path;
a sorting means comprising a plurality of pusher elements for pushing the products to be sorted sideways off respective supporting surfaces at a desired sorting location, at least one pusher element of the of the plurality of pusher elements extends above at least part of at least one load carrying platform and is arranged to be jointly conveyed with the at least one load carrying platform in the conveying direction; and
a drive means for moving the at least one pusher element sideways at the desired sorting location including two guide members;
wherein the front edge of each load carrying platform and the rear edge of each load carrying platform has an arcuate shape, seen in a top plan view,
wherein an arcuate shape of a front edge of each load carrying platform located behind a next load carrying platform along the conveying path abuts an arcuate shape of a rear edge of the next load carrying platform,
wherein the two guide members are separated by a distance in the conveying direction.

21. A sorting device according to claim 20, wherein each of the two guide members is configured to move independently.

22. A sorting device according to claim 20, wherein said drive means comprises at least two guide members for each pusher element, and
wherein each guide member is connected to a respective pusher element by a respective connecting means.

23. A sorting device according to claim 22, wherein each connecting means extends through at least one through slot in a respective load carrying platform.

24. A sorting device according to claim 23, wherein at least one through slot is oriented perpendicular to the conveying direction.

25. A sorting device according to claim 20, wherein each of the two guide members is connected at a respective position to the at least one pusher element by a respective connecting means.

26. A sorting device according to claim 25, wherein the at least one pusher element is connected to at least two of the load carrying platforms,
wherein each of the respective connecting means extends through a slot in a respective load carrying platform.

27. A sorting device according to claim 25, wherein the at least one pusher element is telescopically movable for changing a length of the at least one pusher element.

28. A sorting device according to claim 25, wherein the at least one pusher element is connected to at least one of the two guide members by the respective connecting means in such a manner as to be movable in a longitudinal direction of the at least one pusher element.

29. A sorting device according to claim 20, wherein the drive means comprises a stationary guide oriented at an angle relative to the conveying direction at the sorting location, and
wherein at least one of the two guide members is selectively caused to interact with the stationary guide.

30. A sorting device according to claim 20, wherein the drive means comprises at least one driving motor for each pusher element, and
wherein each driving motor is connected to a load carrying platform associated with a respective pusher element for joint transport in the conveying direction with the load carrying platform associated with the respective pusher element.

31. A sorting device according to claim 20, wherein adjacent load carrying platforms are arranged in line with each other.

* * * * *